(12) United States Patent
Zhang et al.

(10) Patent No.: US 11,346,817 B2
(45) Date of Patent: May 31, 2022

(54) APPARATUS AND METHOD FOR EVALUATING PROPERTIES OF TEMPORARY PLUGGING AGENT BASED ON ACOUSTIC EMISSION

(71) Applicant: China University of Petroleum - Beijing, Beijing (CN)

(72) Inventors: Guangqing Zhang, Beijing (CN); Xuejing Han, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 661 days.

(21) Appl. No.: 16/201,275

(22) Filed: Nov. 27, 2018

(65) Prior Publication Data

US 2019/0360971 A1 Nov. 28, 2019

(51) Int. Cl.
*G01N 29/14* (2006.01)
*G01N 29/46* (2006.01)

(52) U.S. Cl.
CPC ............ *G01N 29/14* (2013.01); *G01N 29/46* (2013.01)

(58) Field of Classification Search
CPC .............. G01N 29/14; G01N 29/46; G01N 2291/02872; G01N 2291/023; G01N 29/16
(Continued)

(56) References Cited

U.S. PATENT DOCUMENTS

| | | | |
|---|---|---|---|
| 6,173,613 B1 * | 1/2001 | Dunegan .............. | G01H 1/00 73/1.82 |
| 10,989,576 B1 * | 4/2021 | Bai ..................... | E21B 21/003 |

(Continued)

FOREIGN PATENT DOCUMENTS

| | | | |
|---|---|---|---|
| CN | 201627577 U | * | 11/2010 |
| CN | 103033565 A | | 4/2013 |

(Continued)

OTHER PUBLICATIONS

Translation CN201627577.*

(Continued)

*Primary Examiner* — Nimeshkumar D Patel
*Assistant Examiner* — Nashmiya S Fayyaz
(74) *Attorney, Agent, or Firm* — Young Basile Hanlon & MacFarlane, P.C.

(57) ABSTRACT

The present invention discloses an apparatus and a method for evaluating properties of a temporary plugging agent based on acoustic emission, wherein the apparatus includes a fracturing machine, an acoustic emission sensor and an acoustic emission analyzer, wherein the fracturing machine is configured to load a sample when oil pressure is stable and remains unchanged in a fracture of the sample, a real fracturing condition being simulated for the sample, and oil being pumped in and a temporary plugging agent being placed into the fracture; the acoustic emission sensor is configured to detect an acoustic wave signal emitted by the sample when the fracturing machine loads the sample; and the acoustic emission analyzer is connected to the acoustic emission sensor and configured to determine that the temporary plugging agent is fractured when a fracture signal occurs in the acoustic wave signal. The present invention can obtain the fracture information of the sample without disturbing the normal experimental process and experimental results, and the experimental measurement results are more practical.

9 Claims, 4 Drawing Sheets

(58) Field of Classification Search
USPC .................................................. 73/801, 587
See application file for complete search history.

(56) References Cited

U.S. PATENT DOCUMENTS

| | | | |
|---|---|---|---|
| 2011/0288843 A1 | 11/2011 | Weng et al. | |
| 2014/0216149 A1* | 8/2014 | Zhou .................. | E21B 47/00 73/152.18 |
| 2017/0277812 A1* | 9/2017 | Holland ................ | E21B 49/02 |

FOREIGN PATENT DOCUMENTS

| | | |
|---|---|---|
| CN | 103048184 A | 4/2013 |
| CN | 104535715 A | 4/2015 |
| CN | 107202866 A | 9/2017 |
| CN | 107355206 A | 11/2017 |

OTHER PUBLICATIONS

Yagn zhinain et al., Research On Fire Resistance of Two-Way Reinforced Concerete Slabs, Wuhan University Press, 2015.

Kai-He, "Oil and gas layer protection technology," China University of Petroleum Press, Sep. 30, 2010.

Li et al., "Preparation and Performance Evaluation of Water Soluble Temporary Plugging Agent for Fracturing," Liaoning Chemical Industry, vol. 45 No. 12, Dec. 2016.

Jiang et al., "study on the performance of wax-bead temporary blocking agent used for refracturing in low-permeability reservoir," Drilling & Production Technology, vol. 29, No. 6, Nov. 2006.

First Office Action and search report dated Jan. 19, 2020 for counterpart Chinese patent application No. 201810493253.5.

* cited by examiner

APPARATUS AND METHOD FOR EVALUATING PROPERTIES OF TEMPORARY PLUGGING AGENT BASED ON ACOUSTIC EMISSION

TECHNICAL FIELD

The present invention relates to the technical field of oil and gas formation development and geotechnical engineering, and in particular to an apparatus and a method for evaluating properties of a temporary plugging agent based on acoustic emission.

BACKGROUND

This section is intended to provide a background or context for the embodiments of the present invention set forth in the claims. The description herein is not admitted to be the prior art as it is included in this section.

As people's demand for the oil increases, the oil exploitation speed is also growing faster. The oil resource is a kind of non-renewable resources, and how to explore the oil with a high yield and a low pollution has become the most concerned issue in the petroleum engineering.

The temporary plugging agent plays an irreplaceable role in increasing the oil production, and can temporarily reduce the formation permeability or temporarily plug the substances in the highly permeable oil formation. The temporary plugging agent is injected into the well after being mixed with a water-soluble polymer, and can quickly form a thin and compact oil formation temporary plugging zone under the effect of a pressure difference, and the plugging can be removed automatically or artificially after a period of time. The temporary plugging agent can be used for flushing the oil well, which better solves the problems of long drainage time, oil formation damage and productivity drop after the flushing, saves the water for cleaning, increases the daily oil production, and reduces the water content. The temporary plugging agent can also be used for intra-fracture turnaround fracturing, wherein the temporary plugging agent is added during the hydraulic fracturing to temporarily form a bridge blinding in a main fracture channel of the hydraulic fracturing and generate a boosting effect, thereby creating new branch fractures or communicating more micro-fractures, increasing the drainage area of the oil/water formation, and improving the production and injection of the oil/water well.

The temporary plugging material formed by the existing temporary plugging technology has a low compressive strength, which often leads to sand washing or pressure leakage during drilling, so it is necessary to measure the compressive strength of the temporary plugging material before fracturing to meet the fracturing requirement, and avoid the phenomenon of sand washing or pressure leakage in the fracturing process. However, the existing conventional methods for measuring the strength of the temporary plugging agent cannot accurately measure the strength of the temporary plugging agent, and thus cannot accurately evaluate the properties of the temporary plugging agent.

SUMMARY

The embodiments of the present invention provide an apparatus for evaluating properties of a temporary plugging agent based on acoustic emission to accurately evaluate the properties of the temporary plugging agent, comprising a fracturing machine, an acoustic emission sensor, and an acoustic emission analyzer, wherein, the fracturing machine is configured to load a sample when oil pressure is stable and remains unchanged in a fracture of the sample, a real fracturing condition being simulated for the sample, and oil being pumped and a temporary plugging agent being placed into the fracture;

the acoustic emission sensor is configured to detect an acoustic wave signal emitted by the sample when the fracturing machine loads the sample; and the acoustic emission analyzer is connected to the acoustic emission sensor and configured to determine that the temporary plugging agent is fractured when a fracture signal occurs in the acoustic wave signal.

The embodiments of the present invention also provide a method for evaluating properties of a temporary plugging agent based on acoustic emission to accurately evaluate the properties of the temporary plugging agent, comprising:

simulating a real fracturing condition, and pumping oil and placing a temporary plugging agent into a fracture of a sample;

loading the sample by a fracturing machine after oil pressure is stable;

retaining the oil pressure unchanged when loading the sample by the fracturing machine, and detecting, by an acoustic emission sensor, an acoustic wave signal emitted by the sample;

determining that the temporary plugging agent is fractured when a fracture signal occurs in the acoustic wave signal.

In the embodiments of the present invention, the properties of the temporary plugging agent are evaluated by means of acoustic emission which is a non-destructive monitoring means and the fracture information of the sample is obtained without disturbing the normal experimental process and the experimental results. In addition, the real fracturing condition for the temporary plugging agent is simulated in an experiment so that the results as measured are more practical. Finally, the strength of the temporary plugging agent measured experimentally is a failure strength obtained by simulating the real fracturing condition of the temporary plugging agent, rather than a uniaxial compressive strength, so the strength as measured is more practical.

BRIEF DESCRIPTION OF DRAWINGS

In order to more clearly describe the technical solutions in the embodiments of the present invention or in the prior art, the drawings to be used in the descriptions of the embodiments or the prior art will be briefly introduced as follows. Obviously, the drawings in the following descriptions just illustrate some embodiments of the present invention, and those skilled in the art can obtain other drawings from them without paying any creative effort. In which.

DESCRIPTION OF EMBODIMENTS

In order to make the objects, technical solutions and advantages of the embodiments of the present invention more clear, the embodiments of the present invention will be further described in detail as follows with reference to the drawings. Herein, the illustrative embodiments of the present invention and the descriptions thereof are intended to explain the invention, but are not intended to limit the invention.

As mentioned above, the temporary plugging material formed by the existing temporary plugging technology has a low compressive strength, which often leads to sand washing or pressure leakage during drilling, while the existing conventional methods for measuring the compressive strength of the temporary plugging agent cannot measure the compressive strength of the temporary plugging agent accurately. The inventors consider that such a problem can be solved by means of acoustic emission, and the acoustic emission means is a non-destructive monitoring means with convenient operations and a high accuracy. Therefore, the embodiments of present invention propose an apparatus and a method for evaluating properties of a temporary plugging agent based on acoustic emission, which simulate the real use environment of the temporary plugging agent, and have a practical significance.

The acoustic emission is a non-destructive detection means. In a material, the phenomenon that a local source rapidly releases energy to generate transient elastic waves is called as acoustic emission (AE). Due to the change of the internal structure of the material, the internal stress of the material is suddenly redistributed, and the mechanical energy is converted into acoustic energy to generate the elastic waves. The frequency of acoustic emission is generally between 1 KHz and 1 MHz.

Figure 1:
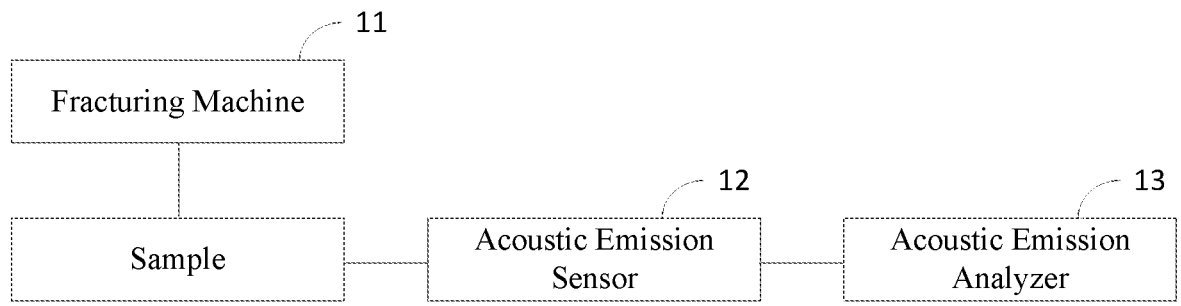
FIG. 1 is a schematic diagram of an apparatus for evaluating properties of a temporary plugging agent based on acoustic emission according to an embodiment of the present invention.

FIG. 1 is a schematic diagram of an apparatus for evaluating properties of a temporary plugging agent based on acoustic emission according to an embodiment of the present invention. As shown in FIG. 1, the apparatus may include: a fracturing machine 11, an acoustic emission sensor 12, and an acoustic emission analyzer 13; wherein, the fracturing machine 11 is configured to load a sample when oil pressure is stable and remains unchanged in a fracture of the sample, a real fracturing condition being simulated for the sample, and oil being pumped and a temporary plugging agent being placed into the fracture;

the acoustic emission sensor 12 is configured to detect an acoustic wave signal emitted by the sample when the fracturing machine loads the sample;

the acoustic emission analyzer 13 is connected to the acoustic emission sensor 12 and configured to determine that the temporary plugging agent is fractured when a fracture signal occurs in the acoustic wave signal.

As can be seen from the above, in the embodiments of the present invention, the properties of the temporary plugging agent are evaluated by means of acoustic emission which is a non-destructive monitoring means, and the fracture information of the sample is obtained without disturbing the normal experimental process and the experimental results. In addition, the experiment simulates the real fracturing condition for the temporary plugging agent, and the results as measured are more practical. Finally, the strength of the temporary plugging agent measured experimentally is a failure strength obtained by simulating the real fracturing condition of the temporary plugging agent, rather than a uniaxial compressive strength, so the strength as measured is more practical.

Figure 2:
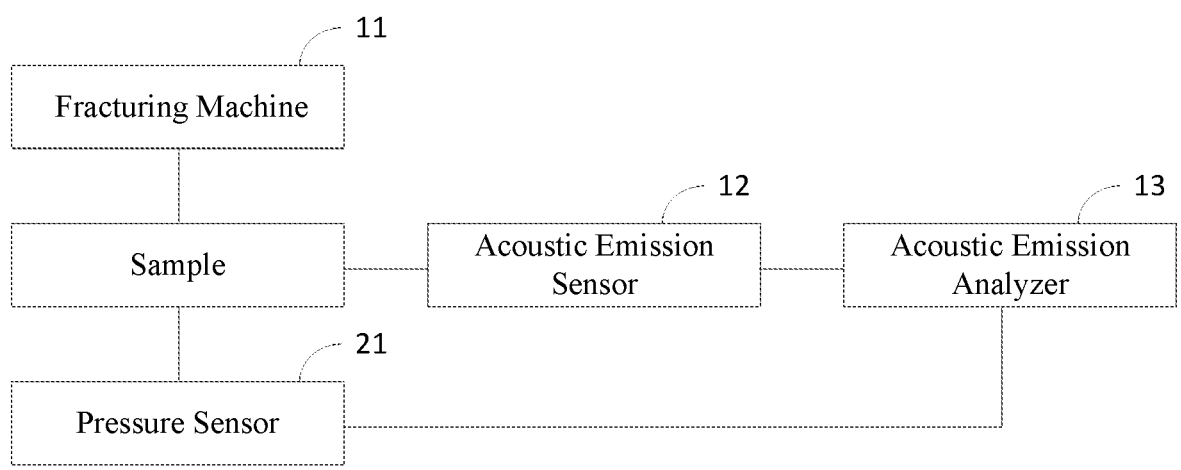
FIG. 2 is a concrete example diagram of an apparatus for evaluating properties of a temporary plugging agent based on acoustic emission according to an embodiment of the present invention.

FIG. 2 is a concrete example diagram of an apparatus for evaluating properties of a temporary plugging agent based on acoustic emission according to an embodiment of the present invention. As shown in FIG. 2, in one embodiment, the apparatus illustrated in FIG. 1 may further include:

a pressure sensor 21 connected to the acoustic emission analyzer 13 and configured to detect a pressure signal loaded to the sample by the fracturing machine 11, and provide the pressure signal to the acoustic emission analyzer 13;

the acoustic emission analyzer 13 is further configured to analyze the pressure signal.

In one embodiment, a Teflon sheet is provided between the pressure sensor and the sample. A Teflon sheet is added between the pressure sensor and the sample to avoid a direct contact between a pressure head and the sample which may damage the experimental instrument and affect the experimental results.

Figure 3:
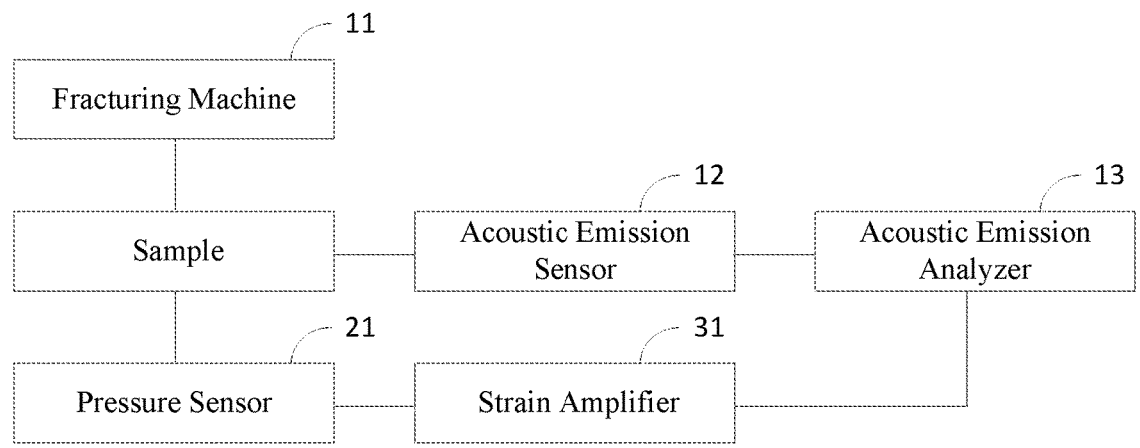
FIG. 3 is a concrete example diagram of an apparatus for evaluating properties of a temporary plugging agent based on acoustic emission according to an embodiment of the present invention.

FIG. 3 is a concrete example diagram of an apparatus for evaluating properties of a temporary plugging agent based on acoustic emission according to an embodiment of the present invention. As shown in FIG. 3, in one embodiment, the apparatus illustrated in FIG. 2 may further include:

a strain amplifier 31 connected between the pressure sensor 21 and the acoustic emission analyzer 13 and configured to amplify the pressure signal.

Figure 4:
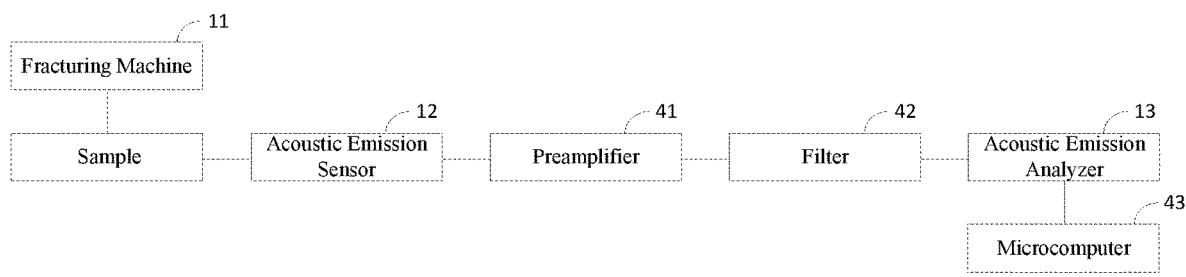
FIG. 4 is a concrete example diagram of an apparatus for evaluating properties of a temporary plugging agent based on acoustic emission according to an embodiment of the present invention.

FIG. 4 is a concrete example diagram of an apparatus for evaluating properties of a temporary plugging agent based on acoustic emission according to an embodiment of the present invention. As shown in FIG. 4, in one embodiment, the apparatus illustrated in FIG. 1 may further include one or a combination of the following instruments:

a preamplifier 41 connected between the acoustic emission sensor 12 and the acoustic emission analyzer 13 and configured to amplify the acoustic wave signal;

a filter 42 connected to an input end of the acoustic emission analyzer 13 and configured to filter an input signal of the acoustic emission analyzer 13;

a microcomputer 43 connected to an output end of the acoustic emission analyzer 13 and configured to log and/or display an analysis result output from the acoustic emission analyzer 13.

One or a combination of the preamplifier 41, the filter 42, and the microcomputer 43 may also be provided in the apparatus illustrated in FIG. 2 or FIG. 3.

Figure 5:
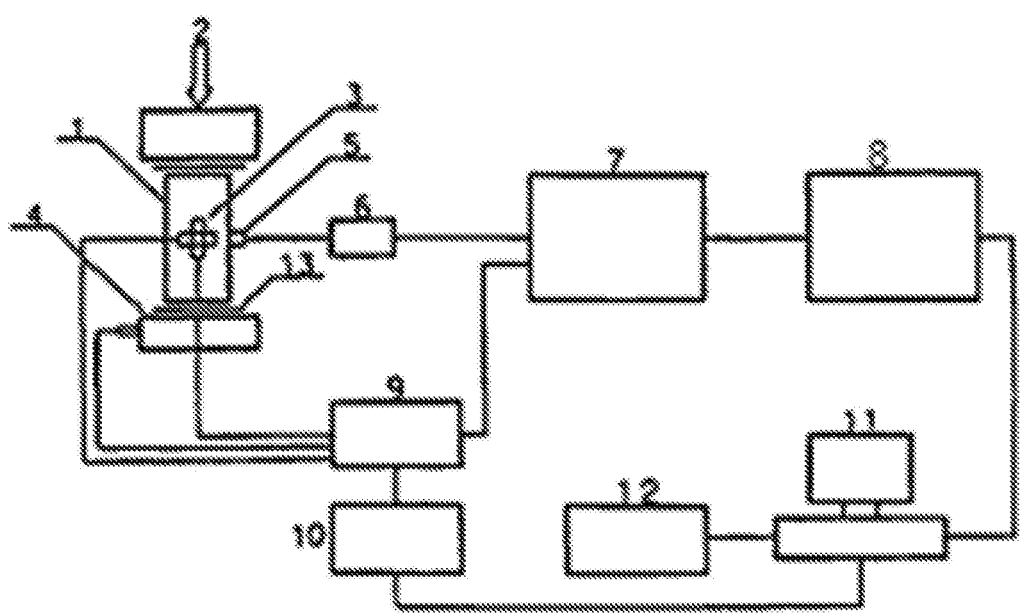
FIG. 5 is a concrete example diagram of an apparatus for evaluating properties of a temporary plugging agent based on acoustic emission according to an embodiment of the present invention.

FIG. 5 is a concrete example diagram of an apparatus for evaluating properties of a temporary plugging agent based on acoustic emission according to an embodiment of the present invention. As shown in FIG. 5, this example respectively illustrates the relative position and connection relationships among a sample 1, a load 2, a strain gauge 3, a pressure sensor 4, an acoustic emission sensor 5, a preamplifier 6, a filter 7, an acoustic emission analyzer 8, a strain amplifier 9, a data logger 10, a microcomputer 11, a printer 12, and a Teflon sheet 13. With the improvement of the acoustic emission acquisition system, the filter 7, the data logger 10, and the like can be integrated.

Based on the same inventive concept, the embodiments of the present invention further provide a method for evaluating properties of a temporary plugging agent based on acoustic emission, as described in the following embodiments. Since the principle of solving the problem by the method is similar to that by the apparatus for evaluating properties of the temporary plugging agent based on acoustic emission, the implementation of the method may refer to that of the apparatus for evaluating properties of the temporary plugging agent based on acoustic emission, and repeated contents are omitted herein.

Figure 6:
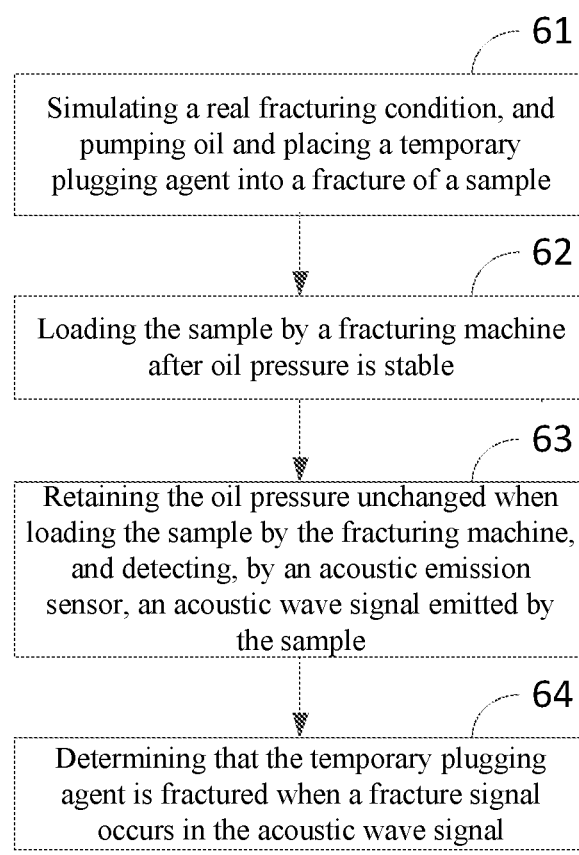
FIG. 6 is a schematic diagram of a method for evaluating properties of a temporary plugging agent based on acoustic emission according to an embodiment of the present invention.

FIG. 6 is a schematic diagram of a method for evaluating properties of a temporary plugging agent based on acoustic emission according to an embodiment of the present invention. As shown in FIG. 6, the method may include:

Step 61: simulating a real fracturing condition, and pumping oil and placing a temporary plugging agent into a fracture of a sample;

Step 62: loading the sample by a fracturing machine after oil pressure is stable;

Step 63: retaining the oil pressure unchanged when loading the sample by the fracturing machine, and detecting, by an acoustic emission sensor, an acoustic wave signal emitted by the sample;

Step 64: determining that the temporary plugging agent is fractured when a fracture signal occurs in the acoustic wave signal.

In one embodiment, the temporary plugging agent is a wax ball;

the step of placing the temporary plugging agent includes placing the following amount of wax ball:

a wax ball amount for initial fracturing: $G=nH_1G_0+G_f$;
a wax ball amount for repeated fracturing: $G=H_2G_R$;

wherein G denotes a wax ball amount; n denotes the number of perforations in an oil formation per meter; $H_1$ denotes a thickness of the perforations in the oil formation; $G_0$ denotes a wax ball amount required by each oillet; $G_f$ denotes an additional wax ball amount; $H_2$ denotes an oil formation thickness; and $G_R$ denotes a wax ball amount for the oil formation per meter.

Before the experiment, the amount of the required temporary plugging agent is calculated based on engineering experiences, and the real working environment of the temporary plugging agent is simulated so that the measurement results are more practical.

In one embodiment, before detecting the acoustic wave signal, the method may further include:

simulating the real fracturing condition, and setting acoustic wave signal detection parameters.

In one embodiment, the acoustic wave signal detection parameters may include an acoustic wave signal detection threshold value and/or a sampling frequency.

In one embodiment, the method for evaluating properties of a temporary plugging agent based on acoustic emission may further comprise:

detecting, by a pressure sensor, a pressure signal loaded to the sample by the fracturing machine;

analyzing the pressure signal;

wherein a Teflon sheet is provided between the pressure sensor and the sample.

Next, taking the method for evaluating properties of a temporary plugging agent based on acoustic emission being applied to the example structure as shown in FIG. 5 as an example, the implementation of an evaluation of the properties of the temporary plugging agent by detecting the strength of the temporary plugging agent by means of acoustic emission is described.

Firstly, before the experiment, the amount of the temporary plugging agent actually to be added into the fracture is calculated, and then a simulation is performed. Taking the wax ball of the oil-soluble temporary plugging agent as an example, a wax ball amount is calculated in the following formulas:

a wax ball amount for initial fracturing:

$$G=nH_1G_0+G_f;$$

wherein G denotes a wax ball amount, in a unit of kg; n denotes the number of perforations in an oil formation per meter, in a unit of perforation/m; $H_1$ denotes a thickness of the perforations in the oil formation, in a unit of m; $G_0$ denotes a wax ball amount required by each oillet, such as 0.25 kg; and $G_f$ denotes an additional wax ball amount, such as 3 to 4 kg.

A wax ball amount for repeated fracturing is:

$$G=H_2G_R$$

wherein G denotes a wax ball amount; $H_2$ denotes an oil formation thickness, in a unit of m; $G_R$ denotes a wax ball amount for an oil formation per meter, such as 10 to 15 kg/m.

After the wax ball amount is calculated, the real fracturing condition is simulated, and the temporary plugging agent with calculated amount is placed into the sample containing an artificial fracture (a major fracture).

Next, the oil is pumped into the artificial fracture of the sample, and the temporary plugging agent prepared in advance is put therein. Meanwhile, parameters such as the threshold value, the sampling frequency, etc. are set in the acoustic emission software in the microcomputer 11, according to the site environment and the basic situation of the temporary plugging agent, and the sample is contacted with a pressure head sensor 4 of the fracturing machine. After the oil pressure is stable, the acoustic emission sensor 5 is bonded on the surface of the sample through a couplant to perform an acoustic wave test, and the experiment is prepared after passing the test.

At the beginning of the experiment, while the fracturing machine starting to load the sample, the acoustic emission software begins to log acoustic waves until the temporary plugging agent is fractured, and the oil pressure remains unchanged in the whole process. When the acoustic emission displays an obvious fracture signal, it means that there exists cracks in the temporary plugging agent.

The strength of the temporary plugging agent as measured in the experiment is a failure strength obtained by simulating the real fracturing condition of the temporary plugging agent, rather than a uniaxial compressive strength, thus the strength as measured can be used to better evaluate the properties of the temporary plugging agent and is more practical.

As mentioned above, in the embodiments of the present invention, the monitoring means of acoustic emission is applied to the measurement of the strength of the temporary plugging agent, and taken as means for evaluating the properties of the temporary plugging agent; the measurement of the strength of the temporary plugging agent is performed in a real use environment of the temporary plugging agent as simulated, and the amount of the temporary plugging agent to be used can be subjected to the engineering calculation and analysis in advance; the measured strength of the temporary plugging agent is not the conventional uniaxial compressive strength, but a strength obtained by simulating the real working environment of the temporary plugging agent, which can be used to better describe and evaluate the properties of the temporary plugging agent.

Those skilled in the art should appreciate that the embodiments of the present invention may be provided as a method, system, or computer program product. Thus, the present invention may take the form of an entirely hardware embodiment, an entirely software embodiment, or a combination of software and hardware embodiments. Moreover, the present invention may take the form of a computer program product embodied on one or more computer usable storage media (including but not limited to disk storage, CD-ROM, optical storage, etc.) in which computer usable program codes are contained.

The present invention is described with reference to the flowcharts and/or block diagrams of the method, device (system) and computer program product according to the embodiments of the present invention. It should be appreciated that each flow and/or block in the flowchart and/or block diagram, and the combinations of the flows and/or blocks in the flowchart and/or block diagram can be implemented through computer program instructions. These computer program instructions may be provided to a general computer, a dedicated computer, an embedded processor or a processor of other programmable data processing device to produce a machine, so that the instructions, which are executed through the computer or the processor of other programmable data processing device, generate means for realizing the functions specified in one or more flows in the flowchart and and/or one or more blocks in the block diagram.

These computer program instructions may also be stored in a computer readable memory which is capable of guiding the computer or other programmable data processing device to work in a specific mode, so that the instructions stored in the computer readable memory generate a manufactured article including instructing means for realizing the functions specified in one or more flows in the flowchart and/or one or more blocks in the block diagram.

These computer program instructions may also be loaded to the computer or other programmable data processing device, so that a series of operation steps can be performed in the computer or other programmable device to generate a processing realized by the computer, thus the instructions executed in the computer or other programmable device provide the steps for realizing the functions specified in one or more flows in the flowchart and/or one or more blocks in the block diagram.

The specific embodiments described above further explain the objects, technical solutions and advantageous effects of the present invention. It should be understood that those described above are just specific embodiment of the present invention, rather than limitations to the protection scope of the present invention. Any amendment, equivalent substitution, improvement, etc. made within the spirit and principle of the present invention should fall within the protection scope of the present invention.

The invention claimed is:

1. An apparatus for evaluating properties of a temporary plugging agent based on acoustic emission, comprising:
   a fracturing machine,
   an acoustic emission sensor, and
   an acoustic emission analyzer,
   wherein the fracturing machine is configured to:
      load a sample when oil pressure in a fracture of the sample is stable and remains unchanged,
      simulate a real fracturing condition for the sample,
      pump fossil oil into the fracture, and
      place the temporary plugging agent into the fracture, wherein the temporary plugging agent is a wax ball and is placed in the following amount which is calculated prior to testing:
         a wax ball amount for initial fracturing: $G=nH_1G_0+G_f$;
         a wax ball amount for repeated fracturing: $G=H_2 G_R$;
         wherein G denotes a wax ball amount; n denotes the number of perforations in an oil reservoir per meter; $H_1$ denotes a thickness of the perforations in the oil reservoir; $G_0$ denotes a wax ball amount required by each perforation; $G_f$ denotes an additional wax ball amount; $H_2$ denotes a thickness of the oil reservoir; and $G_R$ denotes a wax ball amount for the oil reservoir per meter;
   the acoustic emission sensor is configured to detect an acoustic wave signal emitted by the sample when the fracturing machine loads the sample; and
   the acoustic emission analyzer is connected to the acoustic emission sensor and is configured to determine that the temporary plugging agent is fractured when a fracture signal occurs in the acoustic wave signal.

2. The apparatus according to claim 1, further comprising:
   a pressure sensor connected to the acoustic emission analyzer and configured to detect a pressure signal loaded to the sample by the fracturing machine, and provide the pressure signal to the acoustic emission analyzer;
   the acoustic emission analyzer is further configured to analyze the pressure signal.

3. The apparatus according to claim 2, wherein a polytetrafluoroethylene sheet is provided between the pressure sensor and the sample.

4. The apparatus according to claim 2, further comprising:
   a strain amplifier connected between the pressure sensor and the acoustic emission analyzer, and configured to amplify the pressure signal.

5. The apparatus according to claim 1, further comprising one or a combination of the following instruments:
   a preamplifier connected between the acoustic emission sensor and the acoustic emission analyzer, and configured to amplify the acoustic wave signal;
   a filter connected to an input end of the acoustic emission analyzer, and configured to filter an input signal of the acoustic emission analyzer;
   a microcomputer connected to an output end of the acoustic emission analyzer, and configured to log and/or display an analysis result output from the acoustic emission analyzer.

6. A method for evaluating properties of a temporary plugging agent based on acoustic emission, comprising:
   simulating a real fracturing condition, and pumping fossil oil and placing a temporary plugging agent into a fracture of a sample;
   a wax ball amount for initial fracturing: $G=nH_1G_0+G_f$;
   a wax ball amount for repeated fracturing: $G=H_2G_R$;
   wherein G denotes a wax ball amount; n denotes the number of perforations in an oil reservoir per meter; $H_1$ denotes a thickness of the perforations in the oil reservoir; $G_0$ denotes a wax ball amount required by each perforation; $G_f$ denotes an additional wax ball amount;

$H_2$ denotes a thickness of the oil reservoir; and $G_R$ denotes a wax ball amount for the oil reservoir per meter;

loading the sample by a fracturing machine after oil pressure is stable;

retaining the oil pressure unchanged when loading the sample by the fracturing machine, and detecting, by an acoustic emission sensor, an acoustic wave signal emitted by the sample;

determining that the temporary plugging agent is fractured when a fracture signal occurs in the acoustic wave signal.

7. The method according to claim 6, wherein before detecting the acoustic wave signal, the method further comprises:

simulating the real fracturing condition, and setting acoustic wave signal detection parameters.

8. The method according to claim 7, wherein the acoustic wave signal detection parameters comprise an acoustic wave signal detection threshold value and/or a sampling frequency.

9. The method according to claim 6, further comprising:

detecting, by a pressure sensor, a pressure signal loaded to the sample by the fracturing machine;

analyzing the pressure signal;

wherein a Teflon sheet is provided between the pressure sensor and the sample.

\* \* \* \* \*